A. L. LAIRD.
FURNITURE CASTER.
APPLICATION FILED JAN. 3, 1917.
1,221,750.
Patented Apr. 3, 1917.
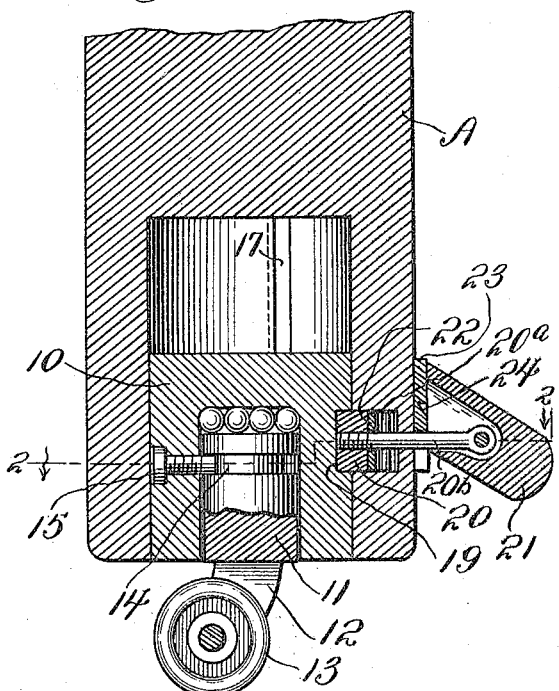
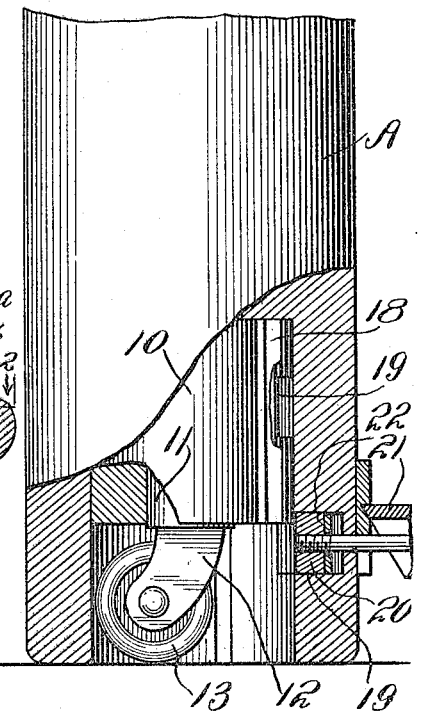
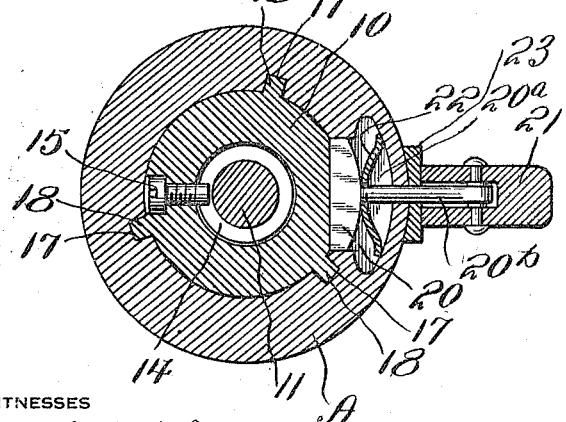
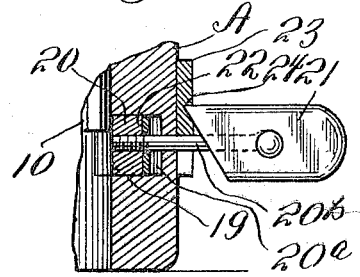
WITNESSES
INVENTOR
A. L. Laird
BY Victor J. Evans
ATTORNEY

UNITED STATES PATENT OFFICE.

ABRAHAM LINCOLN LAIRD, OF COAL CITY, INDIANA.

FURNITURE-CASTER.

1,221,750.  Specification of Letters Patent.  Patented Apr. 3, 1917.

Application filed January 3, 1917. Serial No. 140,428.

*To all whom it may concern:*

Be it known that I, ABRAHAM L. LAIRD, a citizen of the United States, residing at Coal City, in the county of Owen and State of Indiana, have invented new and useful Improvements in Furniture-Casters, of which the following is a specification.

This invention relates to casters primarily designed for use in connection with heavy articles of furniture, such as stoves and the like that occasionally need to be moved from place to place, and cannot be left standing on the casters.

It is the principal object of this invention to provide a caster capable of moving within the leg of the furniture when its use is not desired, thereby permitting the furniture to be supported by the legs thereof, the caster being capable of assuming an active position, and locked in an active position when its use is desired.

The nature and advantages of the invention will be better understood from the following description when read in connection with the accompanying drawing, the invention residing in the construction, combination and arrangement of parts as claimed.

In the drawing forming part of this specification like numerals of reference indicate similar parts in the several views and wherein:—

Figure 1 is a view showing a portion of a furniture leg with the caster projected for use.

Fig. 2 is a sectional view taken on line 2—2 of Fig. 1.

Fig. 3 is a sectional view through the leg showing the caster positioned therein when its use is not desired.

Fig. 4 is a detail sectional view showing the caster locked within the leg.

Referring more particularly to the drawing in detail A indicates the leg of an article of furniture which may be of any suitable character, the leg being preferably round in cross section, although the cross sectional configuration may vary without departing from the spirit of the invention. The leg is hollow for a portion of its length to receive a cylindrical member 10, which is open at one end to receive the plug 11 between the parallel limbs 12 of which the caster roller 13 is journaled. The plug 11 is provided with a groove 14 which receives the extremity of a threaded fastening element 15 which is passed through a suitable opening in the cylindrical member 10, the threaded element 16 while permitting the yoke 11 to rotate within the opening of said member, prevents the caster proper from becoming casually separated therefrom. The leg A is provided with diametrically opposed grooves 17 which receive the tongues 18 on the cylindrical member 10, whereby the latter is guided in its sliding adjustment within the leg, and at the same time prevented from turning therein. When use of the caster is not desired it is positioned within the leg A in the manner shown in Fig. 3, but when it is desired to move the furniture the article is lifted a slight distance from the floor or surface to permit the caster to assume an active position.

With a view of locking the caster projected in any active position, the member 10 is recessed as at 19 to receive a locking element 20 that is normally positioned within a recess 20ᵃ provided in the leg A, and registering with the recess 19 of the member 10 when the latter is projected in the manner shown in Fig. 1. The locking element 20 is carried by one end of a stem 20ᵇ, the latter being horizontally disposed and mounted to slide through an opening in the leg A. The stem 20ᵇ also slides through an opening in a leaf spring 22, which is normally bowed and arranged within the recess 20ᵃ of the leg. The spring as is obvious is interposed between the wall of the recess 20ᵃ and the locking element 20, and is tensioned to exert a pressure upon the locking element 20 so as to normally tend to project this element from within the recess 20ᶜ to an active position. A knob 21 is carried by the stem 20ᵇ whereby the latter may be easily manipulated to withdraw the locking element 20 from the recess 20ᵃ in the member 10, when it is desired to allow the caster in its entirety to assume an inactive position within the leg A as clearly shown in Fig. 3. The knob 21 is hollow for a portion of its length for the reception of the projected portion of the stem 20ᵇ, this construction being provided to permit the knob 21, which is pivotally mounted upon the stem 20ᵇ, to assume an inclined position with respect to the leg A when the caster is in use, and to assume a true horizontal position in the manner shown in Fig. 4 to hold the locking element 20 within the recess 20ᵃ of the leg when the caster is positioned within the leg. A plate 23 is secured to the leg A, and is bifurcated at its lower end to straddle the stem 20ᵇ. The plate is provided with a notch 24 at an appropriate point in its length to receive the edge of the knob 21 when the latter is in a horizontal position, the notch serving to hold the knob 21 in the position shown in Fig. 4. It is of course understood that when the locking element 20 is retracted within the recess 20ᵃ of the leg, the spring 22 is substantially flattened and placed under its greatest tension, so that when the caster gravitates to an active position, the spring functions to forcibly drive the locking element 20 into the recess 19 of the caster. This however takes place subsequent to the removal of the knob 21 out of the notch 24. The open end of the knob is inclined to properly engage the plate 23 when the parts are in active position as shown in Fig. 1.

In practice, assuming that the caster is positioned within the leg as shown in Fig. 3, the article of furniture is lifted to permit the caster to assume an active position, and the knob 21 disengaged from the slot 24 to allow the locking element to be forcibly projected within the recess 19 when the latter is brought into registration with the recess 20ᵃ in the leg, whereupon the caster is locked in an active position. After the article of furniture has been moved to its proper destination, the locking element 20 is retracted into the recess 20ᵃ, and locked therein by adjusting the knob 21 to position the same within the notch 24 of the plate 23. Subsequent to this operation the caster will be moved within the leg of the furniture as the latter is lowered to the floor or surface.

While it is believed that from the foregoing description the nature and advantages of the invention will be readily apparent, I desire to have it understood that what is herein shown and described is merely illustrative of the preferred embodiment of the invention to which I do not limit myself, and that such changes may be resorted to when desired as fall within the scope of what is claimed.

What is claimed is:—

1. A device of the class described comprising a caster carrying member slidably fitted within the leg of an article of furniture, said member being provided with a recess, a stem slidable through an opening in the leg, a spring pressed locking element carried by the stem and adapted to be projected within the recess of said member when the latter assumes an active position, a knob carried by the projected extremity of the stem and pivotally mounted thereon, and capable of assuming an inclined or a horizontal position, and said knob coöperating with said leg when in horizontal position to hold the locking element retracted in an inactive position.

2. A device of the class described comprising a caster carrying member slidably fitted within the leg of an article of furniture, means for guiding said member in its adjustments, said member being provided with a recess, a stem slidable through an opening in said leg, a spring pressed locking element carried by the stem and adapted to be projected within the recess of the member when the latter assumes an active position, a knob pivotally mounted upon the projected extremity of said stem and having an inclined end portion, said leg having a notch to receive the edge of said knob when the latter is in one of its adjusted positions, whereby said locking element is held retracted in an inactive position.

3. A device of the class described comprising a caster carrying member slidably fitted within the leg of an article of furniture, means for guiding said member in its adjustments, said leg having a recess, a stem slidable through an opening in the leg, a locking element carried by the stem and operating within said recess, said member having a recess adapted to register with the recess in the leg when said member is in active position, means for manipulating the locking element and holding the latter in an inactive position within the recess of the leg, and a spring arranged within said recess and bearing against the locking element to project the latter into the recess of said member, when said locking element is released from the last mentioned means.

In testimony whereof I affix my signature.

ABRAHAM LINCOLN LAIRD.

Copies of this patent may be obtained for five cents each, by addressing the "Commissioner of Patents, Washington, D. C."